United States Patent
Hunter

[11] 3,855,841
[45] Dec. 24, 1974

[54] METHOD OF TESTING VEHICLE SHOCK ABSORBERS AND APPARATUS THEREFOR

[76] Inventor: Lee Hunter, 13501 Ladue Rd., Ladue, Mo. 63141

[22] Filed: Feb. 23, 1973

[21] Appl. No.: 335,349

[52] U.S. Cl. ................................ 73/11, 73/71.7
[51] Int. Cl. ................................ G01m 17/04
[58] Field of Search ..................... 73/11, 71.7

[56] References Cited
UNITED STATES PATENTS

| | | | |
|---|---|---|---|
| 2,934,940 | 5/1960 | Beissbarth | 73/11 |
| 3,477,273 | 11/1969 | Scheider | 73/11 |
| 3,690,145 | 9/1972 | Brisard | 73/11 |

FOREIGN PATENTS OR APPLICATIONS

| | | | |
|---|---|---|---|
| 2,068,853 | 3/1971 | France | 73/11 |

*Primary Examiner*—James J. Gill
*Assistant Examiner*—Anthony V. Ciarlante
*Attorney, Agent, or Firm*—Gravely, Lieder & Woodruff

[57] ABSTRACT

A method of testing vehicle shock absorbers, one at a time or in pairs, while on the vehicle by causing the vehicle to be jounced at least through the critical frequency of the suspension system and displaying the maximum down load exerted by the vehicle on its supporting structure to obtain a visual concept of the dynamic response of the shock absorbers. The method is practiced by apparatus in which the support for the vehicle wheels is oscillated at a constant amplitude and through a linearly increasing speed cycle to gradually carry the suspension system through its critical frequency where the down load of the vehicle on the support reaches a maximum, and in which electrical means is incorporated to obtain and display that maximum down load reading in terms of the dynamic response of the shock absorbers.

7 Claims, 17 Drawing Figures

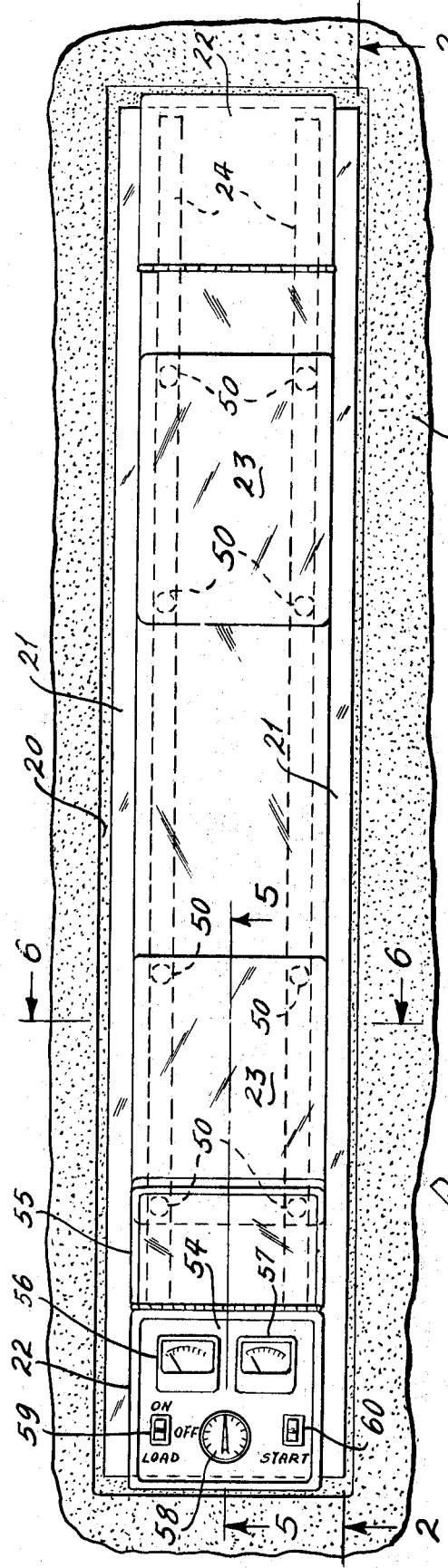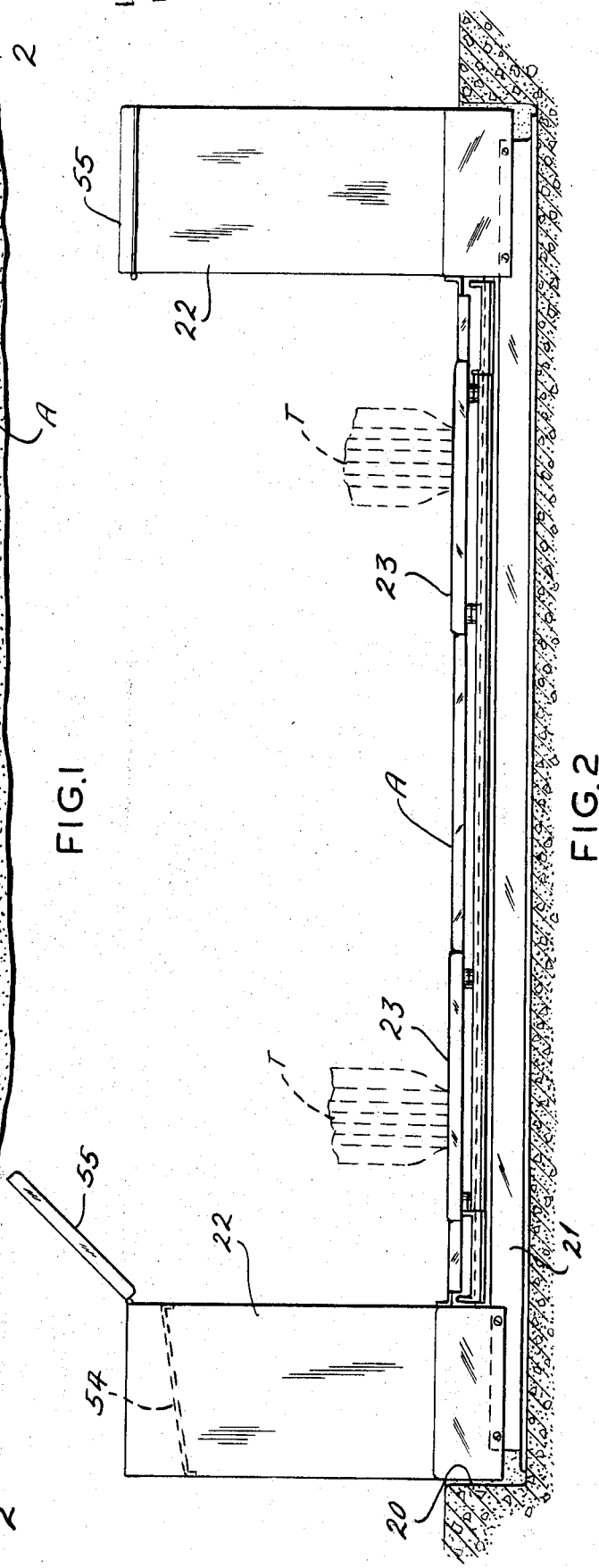
FIG.1
FIG.2

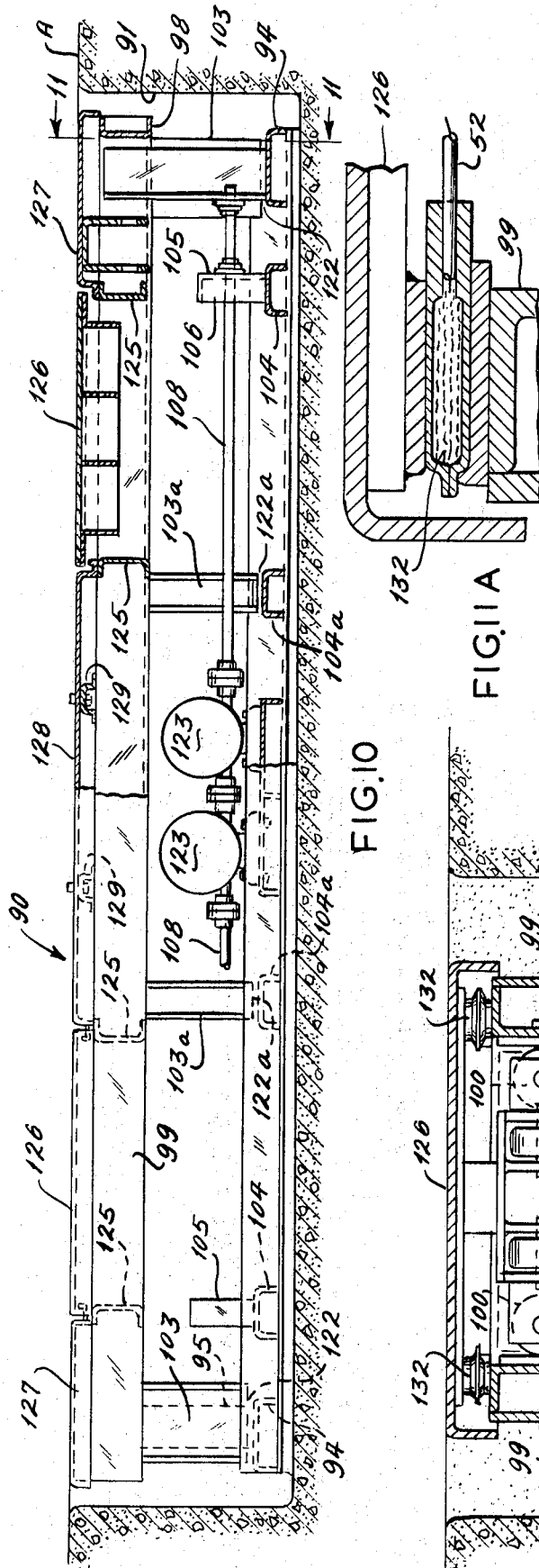
FIG.10
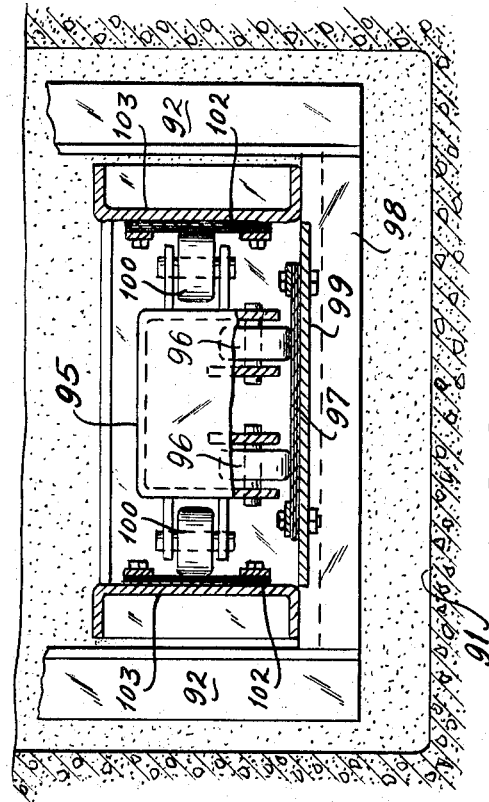
FIG.11A
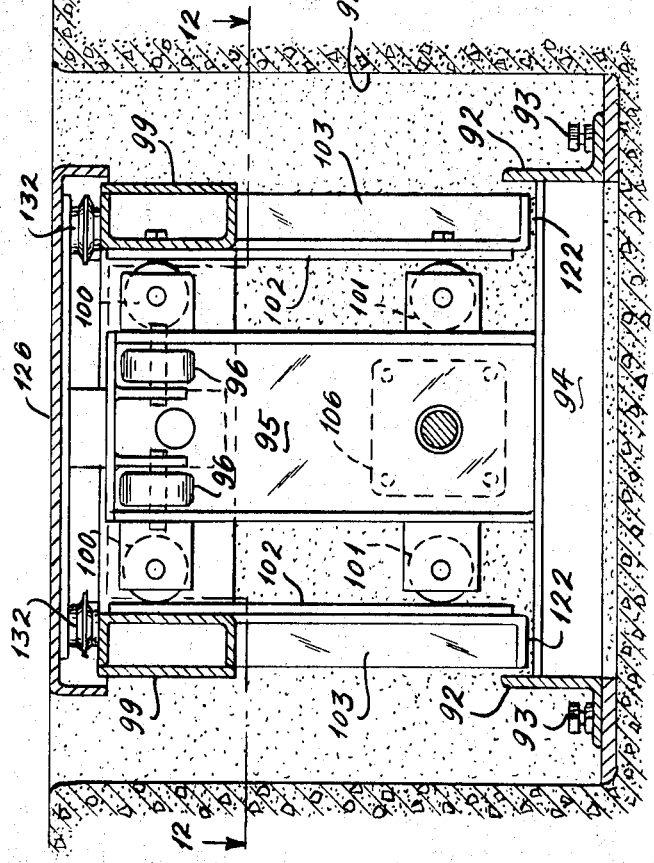
FIG.11
FIG.12

METHOD OF TESTING VEHICLE SHOCK ABSORBERS AND APPARATUS THEREFOR

BACKGROUND OF THE INVENTION

This invention relates to a method for determining the condition of effectiveness of shock absorbers in the suspension system of vehicles, and to apparatus for carrying the method into practice with the shock absorbers installed in normal manner in the vehicle suspension system.

Apparatus for the testing of shock absorbers while installed in a vehicle suspension system is presently known. In some apparatus the test is carried out by jouncing the vehicle by its wheels and observing the number of oscillations performed or the peak movement obtained before the vehicle comes to rest. Another way is to remove each shock absorber and subject it to a load test. The need for apparatus to test shock absorbers is relatively great for the safety of vehicle operators, as service people merely look to see if there is evidence of fluid leakage around the rod seal, and if leakage has occurred, it is usually taken to mean that the shock absorber is faulty or not performing as it should. Some service people have the ability to drive the vehicle and obtain a feel of faulty shock absorbers in a sort of a "seat of the pants" test which is at best a mere guess as to which shock absorber may be at fault. In the latter cases it usually results in installing the new shock absorbers in pairs for the front or rear wheel suspension means, on the sometimes erroneous explanation that it is best to install shock absorbers in pairs to obtain substantial equality of action of the suspension systems.

It is, of course, understood that shock absorbers are used to control and limit the reaction of the suspension springs so that the springs when set in motion will not continue to react for any but a very short time. Also, the shock absorbers contribute greatly to the directional stability of a vehicle when the wheels unequally respond to road surfaces. In short, the shock absorbers make the difference between safe riding and handling of a vehicle and one that is truly dangerous to the occupant and to others. Since the so-called "soft-ride" is so much in favor, it is extremely important to have properly operating shock absorbers. Therefore, the need for reliable and easily operated shock testing apparatus is great, and it is especially needed as the visual inspection for leaking shock absorbers can no longer be relied upon.

SUMMARY OF THE INVENTION

According to the present invention, the testing of shock absorbers is carried out by oscillating the vehicle suspension system for a single wheel or for a pair of wheels through the critical frequency where the greatest down load is exerted on the associated shock absorbers. The load is converted into electrical responses for the individual shock absorber, as well as for the pair under the load test, and the loading is visually displayed on suitable meters to permit the performance to be compared with a standard for the make of shock absorbers and class of vehicle being tested. It is convenient to use electrical means to produce information about the functioning of shock absorbers in vehicle suspension systems so that the visual display can be remotely located.

In certain preferred embodiments, apparatus capable of supporting the pairs of front or rear wheels of a vehicle is arranged to be moved up and down through a predetermined stroke and in a cycle that is gradually increased until the vehicle suspension system exceeds its critical frequency where the greatest down load is exerted on the supporting apparatus. The need to exceed the critical frequency is so that the operator can be sure that the critical frequency has been reached. The areas in the apparatus actually engaged by the vehicle wheels are provided with load responsive elements, such as piezoelectric transducers, which generate signals proportional to the load, and the signals are used to energize suitable meters which display the value of the signals in terms of shock absorber response. The meter readings are then compared with a predetermined standard for the make of shock absorbers being tested and the weight class for the vehicle.

The present invention is directed also to the testing of pairs of shock absorbers so that it can be determined if there is a balance in shock absorber action or performance between the two sides of the vehicle. It is important to maintain equality of action of suspension systems on each side of the vehicle so that the vehicle will be prevented from going into a combination pitch and roll action when the vehicle is suddenly braked or encounters a rough road surface. Properly active shock absorbers of a pair are intended to complement each other and hold a vehicle steady when the brakes are applied or when one wheel of a pair encounters a rough surface. However, when the shock absorbers of a pair are out of balance, such as one being weak due to leakage or age, the manual side to side balance in the suspension system is disturbed and erratic vehicle behavior results.

Accordingly, it is an object of this invention to determine whether the shock absorber in a vehicle wheel suspension system is performing within predetermined tolerances by vertically oscillating the vehicle through its wheel suspension system, and until the critical frequency is passed through, measuring the force exerted by the vehicle on its downward travel, and displaying the maximum force value obtained for comparison with predetermined tolerances.

It is another object of this invention to provide apparatus that will effectively subject vehicles to critical frequency jouncing and convert the jouncing into electrical signals for processing in terms of shock absorber performance for each shock absorber of a pair, and in which a good comparison can be made of the contribution each shock absorber makes to the associated suspension means.

BRIEF DESCRIPTION OF THE DRAWINGS

The presently preferred embodiments of the invention are shown in the accompanying drawings, wherein:

FIG. 1 is a plan view of one embodiment of the vehicle shock absorber testing apparatus;

FIG. 2 is a sectional elevational view of the apparatus taken along line 2—2 in FIG. 1;

FIG. 10 is a longitudinal and partially sectional elevational view of another embodiment of the present invention;

FIG. 11 is a transverse sectional view taken along line 11—11 in FIG. 10 to show the mounting at one end which is typical of the opposite end also;

FIG. 11A is a fragmentary sectional view of a part of FIG. 11 to show a typical transducer employed in the apparatus herein disclosed;

FIG. 12 is a fragmentary sectional view taken along line 12—12 in FIG. 11;

DETAILED DESCRIPTION OF THE EMBODIMENTS

Figure 8:
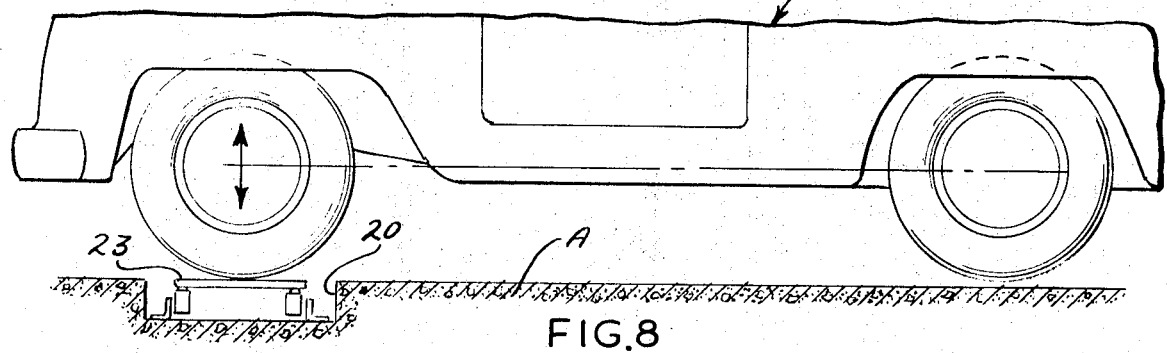
FIG. 8 is a fragmentary and diagrammatic view of a vehicle with a set of wheels positioned on the testing apparatus.

In FIGS. 1 and 2 there is shown the general arrangement of one embodiment of apparatus for testing vehicle shock absorbers in pairs for the front or rear wheel suspension systems. The service area A in which the apparatus is intended to be installed is provided with a shallow pit 20 to receive a suitable frame the principal members of which are spaced angle irons 21, for supporting a longitudinal beam structure suspended from its opposite ends by jacks mounted in the end cabinets 22. The beam structure carries a pair of vehicle tire support plates 23 which are mounted for movement with the beam structure in a vertical path. The vehicle tires T, either front or rear, are disposed on the plates 23 as shown in FIGS. 1 and 8.

Figure 3:
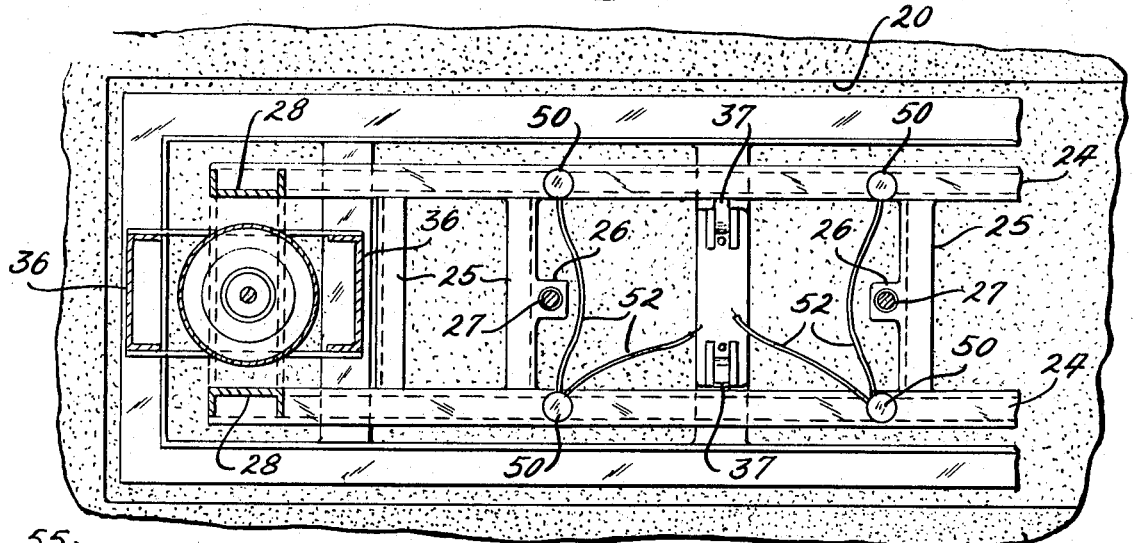
FIG. 3 is a fragmentary sectional view taken along line 3—3 in FIG. 5.
Figures 5, 7:
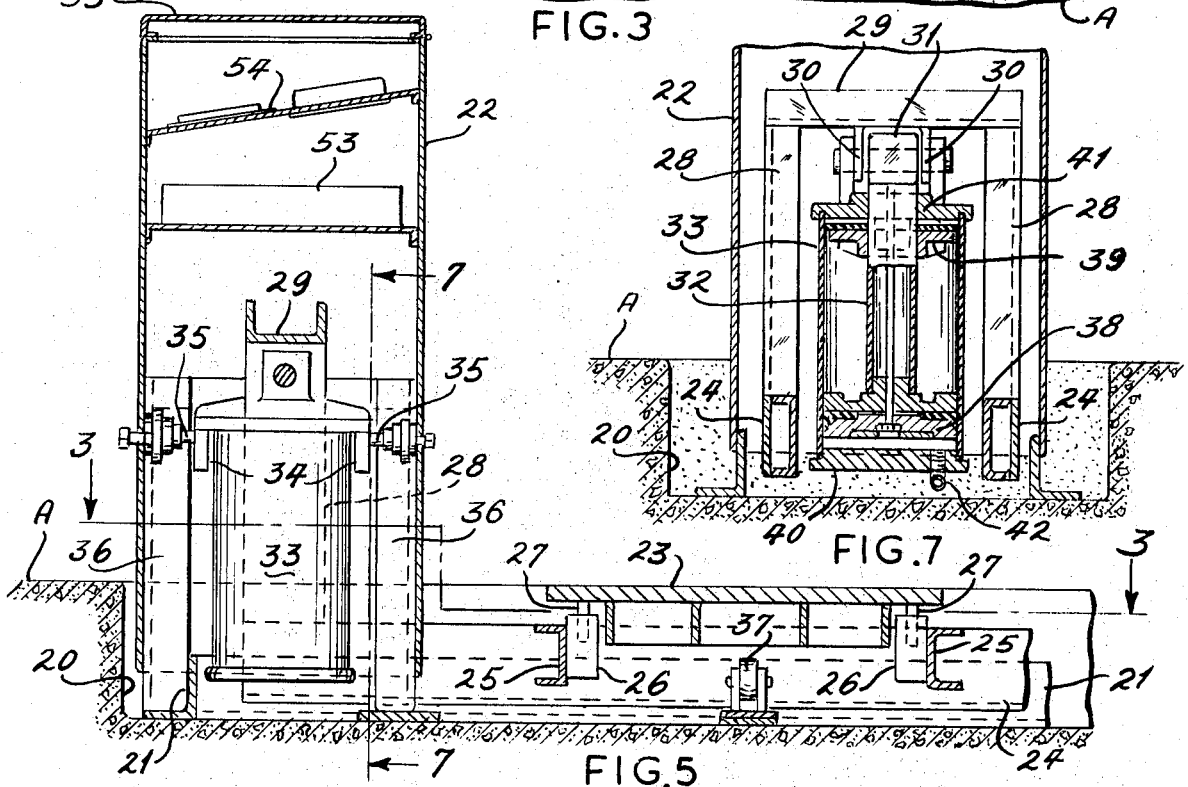
FIG. 5 is a fragmentary sectional elevational view taken along line 5—5 in FIG. 1.
FIG. 7 is a fragmentary sectional elevational view taken along line 7—7 in FIG. 5.
Figure 6:
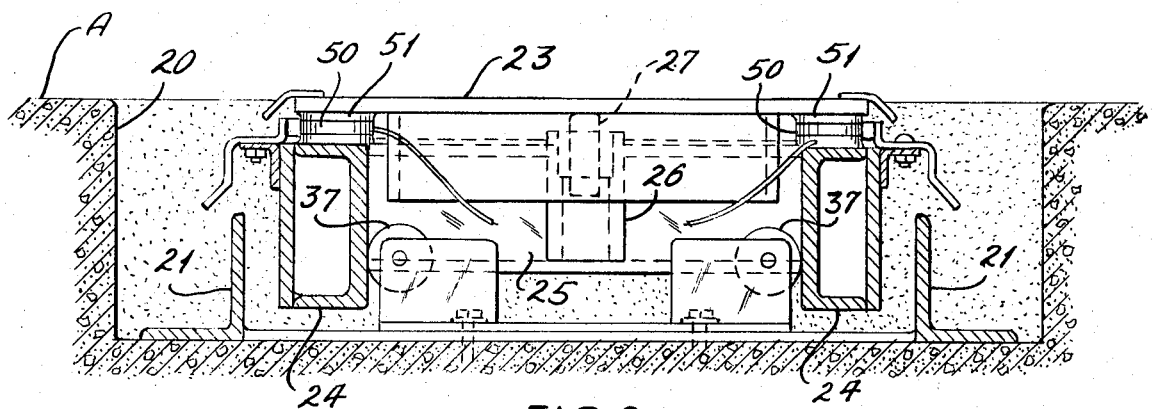
FIG. 6 is a transverse sectional elevational view taken along line 6—6 in FIG. 1.
Figure 4:
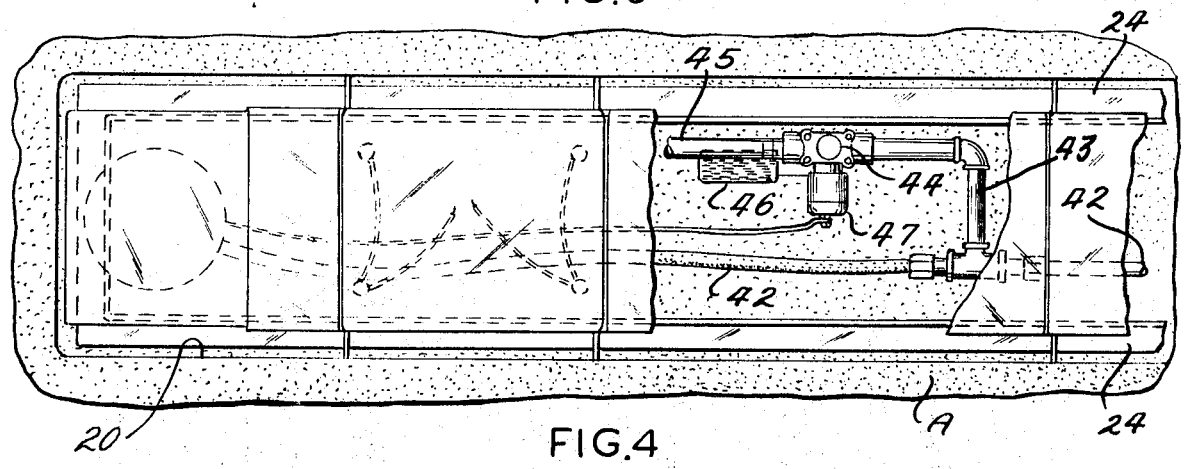
FIG. 4 is a fragmentary plan view, partly broken away, to show certain details of the operating components.

The beam structure is best seen in FIGS. 3, 4 and 6 wherein a pair of elongated box beam members 24 extend through the pit 20 and are interconnected by suitable channel shaped cross-members 25 spaced along the length thereof such that a pair of the cross members 25 are aligned with the ends of the tire support plates 23 and can be seen upon removing the plates 23. For example, in FIGS. 3 and 5, the cross members 25 carry alignment dowl sockets 26 to receive the dowl pins 27 (FIG. 5) secured on the under side of the left hand tire plate 23. The dowls and sockets keep the respective plates 23 properly aligned on the elongated box beam members 24. The right hand tire plate 23 is similarly mounted.

The support and drive means for oscillating the elongated beam assembly or structure is the same at each end, so it will not be necessary to show both. It will be sufficient to describe the left end of the beam structure shown in FIGS. 3, 5 and 7. The ends of the elongated box beam members 24 are secured to vertically directed legs 28 of a yoke suspension assembly having the top channel-shaped cross-member 29 connecting the legs 28. The top member 29 carries a pair of spaced depending lugs 30 between which is mounted the upper end 31 of a jack piston rod, the lower end 32 operatively working in its cylinder 33. The cylinder is formed with sockets 34 on opposite sides to receive the inner ends of pivot shafts 35. The shafts 35 are carried in the legs 36 of a fixed support assembly for the jack cylinder 33. In this manner, the cylinder 33 is capable of swinging about the axis of the shafts 35 if the box beam members 24 are caused to move by a vehicle driving onto or off tire plates 23. However, the box beam members 24 are stabilized and prevented from such movement by the fixing of rollers 37 in the floor of the pit 20 to engage on the inner surfaces of the box beam members 24 and maintain these beams moving in a vertical path. Similar rollers 37 (not shown) are provided at the opposite tire plate location work to accomplish the maintaining of a vertical path of movement for the box beams 24.

Each jack actuating means is housed in a cabinet 22 (FIGS. 2 and 5) so that upon being energized the entire beam structure carrying the tire plates 23 is moved in a vertical path having a one inch stroke. The stroke is set by the construction of the jack piston 32 having a pair of spaced heads 38 and 39 (FIG. 7) which check the piston movement by abutting the cylinder heads 40 and 41. Fluid under pressure is admitted through the lower cylinder head 40 to the piston head 38 by a conduit 42. A similar arrangement is provided for the jack means in the opposite cabinet 22.

As seen in FIG. 4, the fluid pressure conduits 42 from the respective jacks are connected to a common conduit 43 which is provided with a control valve 44, and a supply conduit 45 is connected to the valve 44. The valve 44 has a muffler 46 over the exhaust port, and a solenoid controller 47 operates the valve to admit fluid to conduit 43 or exhaust conduit 43. Thus, the jack means at the ends of the beam structure are simultaneously pressurized to raise the beam structure in a generally level manner and exhausted to allow the beam structure to fall by its weight and the weight of the vehicle positioned on the plates 23.

The fall or drop of the beam structure is checked by the jack piston heads 38, and the resulting drop of the vehicle is absorbed by the wheel suspension system which contains the shock absorber. The force of the drop is picked up by piezoelectric transducers 50 (FIG. 6) disposed between the tire plates 23 and the box beam members 24. The manner of use of the transducers is shown in FIGS. 1, 3 and 6 where a transducer is positioned under each corner of the plate 23 and is attached to the top surface of the box beam members 24 so as to register with pads 51 attached to the under side of the plate 23. Placement of the transducers at each corner of the plates 23 is equivalent to spacing the transducers symmetrically around the boundary of the plate 23 so that the vehicle wheels may be placed anywhere on the plates 23. The transducers are crystals sandwiched between two thin metallic plys, and the four transducers for each tire plate 23 are electrically connected by leads 52 to produce a signal which is proportional to the force developed between the vehicle wheel and its supporting plate 23. The electrical connections for the four transducers is such that the signals from each is collected and summed up so that a wheel placed at any area on the plate 23 will produce a total reading from the transducers. A separate signal is thus produced by the load exerted on each plate 23. The signals are conducted to electronic means 53 located on a shelf in one of the cabinets 22, as the left hand cabinet 22 in FIG. 1. The latter cainet has a console panel 54 which is accessible when the hinged cover 55 is opened. The panel supports a left shock absorber gauge 56, a right shock absorber gauge 57, a fluid pressure gauge 58, an ON-OFF and load switch 59, and a start switch 60.

The operation of the apparatus in the several views is as follows.

After a vehicle V (FIG. 8) is positioned (for example) with its front wheels on the wheel plates 23 of the testing apparatus, the switch 59 is moved to the ON position to supply pressure fluid to the valve 44 (FIG. 4) and to condition the circuits in means 53 (FIG. 5). When the start switch 60 is actuated the electrical power from line 61 is turned on to ramp generator 62, and the electronic means is cleared of all previous readings so that the gauges are brought to zero and are ready for new readings. The ramp generator 62 produces a slowly increasing voltage signal which is fed to a voltage controlled oscillator 63 where the signal is periodically passed to a buffer amplifier 64 and then to the control solenoid 47 at the valve 44. The net result is that the valve 44 is cycled on-off at a slowly increasing rate matching the ramp generator signal. The cycling of the valve 44 causes the drive means to operate and set up the vertical movement of the entire beam assembly, so that the vehicle V is jounced at an increasing rate to be sure the suspension system is taken through its critical frequency to reach the maximum jounce effect on the tire plates 23. After the critical frequency is reached the apparatus shuts itself off.

Figure 9:
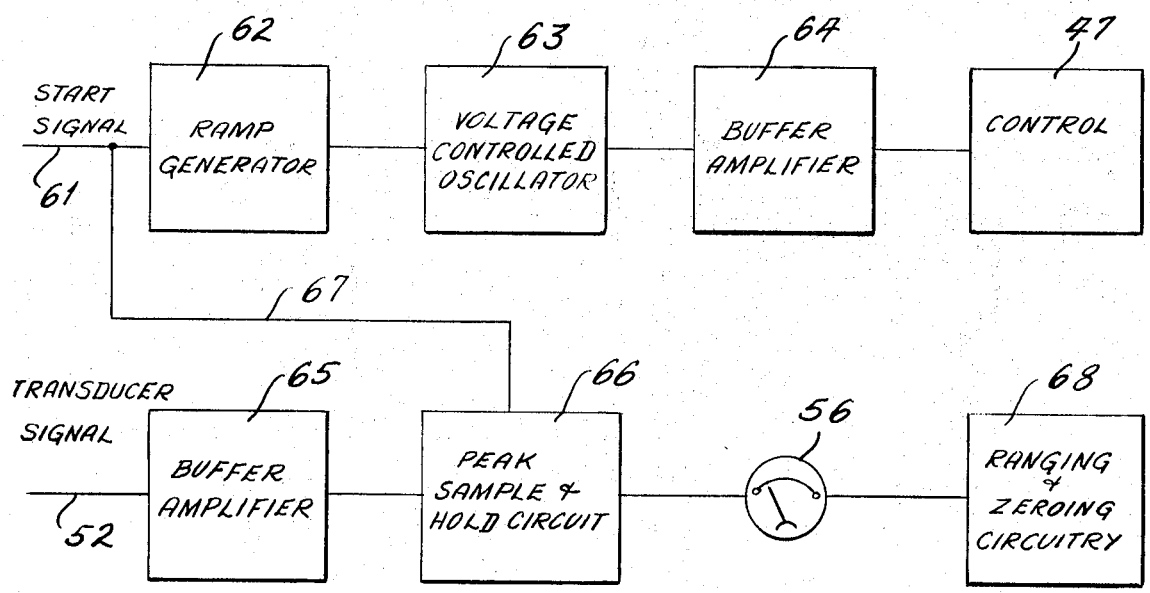
FIG. 9 is an electrical block diagram of the control means and components employed in the apparatus of FIG. 1.

While the vehicle V is jounced the transducers 50 under each tire plate 23 produce a signal which is transmitted by lead 52 to its associated buffer amplifier 65 (FIG. 9). The signal is sampled continually and the peak signal is fed to a hold circuit or memory 66 which is energized through line 67 upon actuation of switch 60 that produces the start signal. The collective additive transducer signals are proportional to the pressure exerted by the tire on the plate 23 and that pressure is proportional to the force which the shock absorber sustains while the vehicle is being jounced at an increasingly rapid rate. The apparatus jounces the vehicle until the critical frequency of the suspension has been equalled or just exceeded and then stops. All the while the transducer signal is fed to the hold circuit 66 and the average signal is released to the gauge 56 which visually displays the value of the signal, subject, of course, to the ranging and zeroing circuitry 68 for the gauge 56, whereby the gauge is calibrated for a shock absorber performance value. It is understood that the gauges 56 and 57 display the responses of the left and right shock absorbers, and the responses may be the same or different as will be discussed presently.

Figure 13:
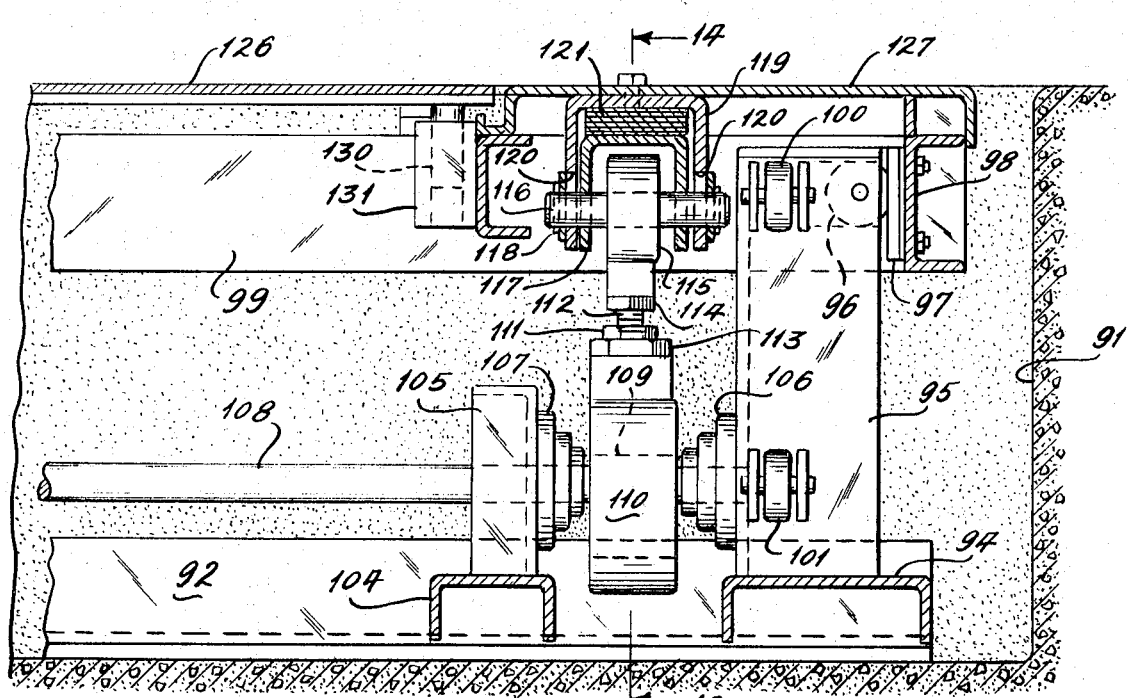
FIG. 13 is a fragmentary sectional elevational view of a typical assembly of eccentric drive means for one end of the embodiment of FIG. 10.
Figure 14:
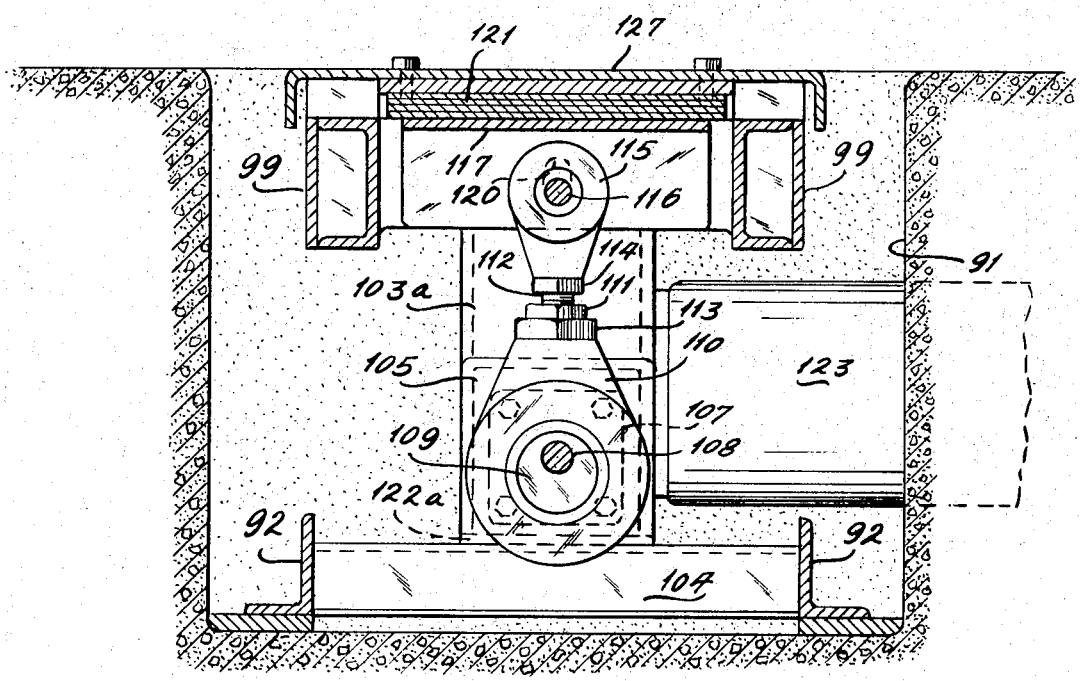
FIG. 14 is a sectional view at line 14—14 in FIG. 13.
Figure 16:
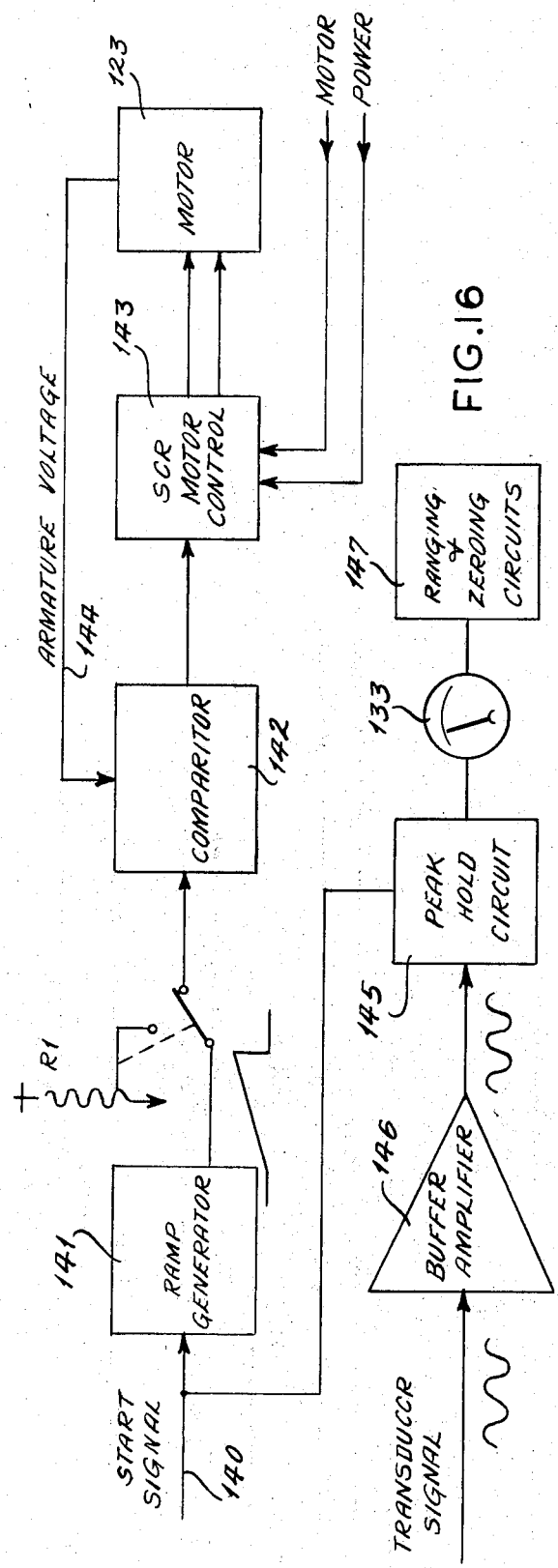
FIG. 16 is an electrical block diagram of the circuits associated with the panel of FIG. 15.
Figure 15:
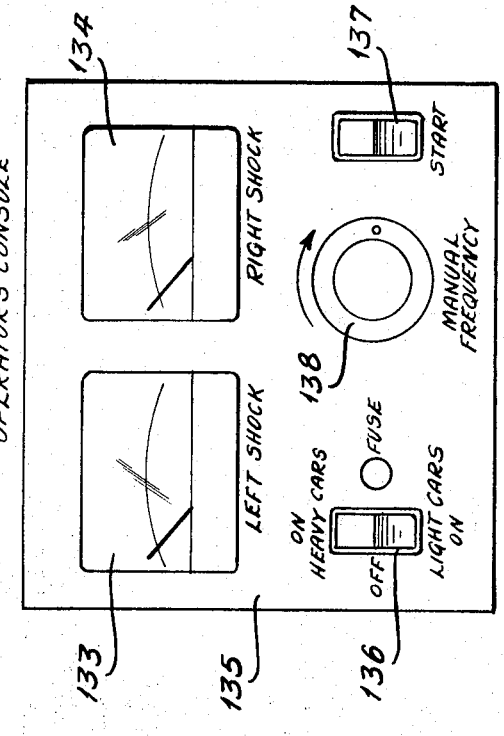
FIG. 15 is a schematic view of the operator's panel for the embodiment of FIG. 10.

Another embodiment of the present invention is shown in FIGS. 10 to 14, and the associated electronic system is shown in FIGS. 15 and 16. In the several views of the embodiment the assembly 90 is set into a floor pit 91 such that the spaced apart longitudinal angle iron feet 92 (see FIG. 11) can be levelled by suitable screw means 93 before the grout is put in place. A channel support 94 at each end of, and set cross ways of the length of the feet 92, supports a vertical column 95 of channel shape. In FIGS. 12 and 13 it is seen that each column 95 carries internal guide rollers 96 engaged on a common wear pad 97 fastened to the adjacent cross member 98 secured between the longitudinally extending and parallel box beam members 99. Each column 95 also supports exterior guide rollers 100 near the top and rollers 101 near the bottom, these rollers engaging pads 102 carried on the inside surface of the box beam members 99 and the attached depending legs 103. The vertical path of movement of the box beam members 99 is determined and fixed by the rollers 96, 100 and 101 in position at each end of the assembly.

The drive means for vertically moving the assembly of box beam members is located at each end, and one of the means is seen in detail in FIGS. 13 and 14. The cross-channel support 94 carries the vertical column 95 and spaced inwardly thereof is a second cross-channel support 104 on which there is secured a bearing support 105. Suitable bearing means 106 is mounted on the column 95 and a second bearing 107 is carried on the support 105. These bearings support a drive shaft 108 which is engaged in an eccentric 109 in the eye of the crank rod 110. The crank rod 110 is adjustably connected, through threaded elements 111 and 112 and respective lock nuts 113 and 114, to the upper end 115 of the crank assembly. The upper end 115 of the crank assembly carries a cross pin 116 which is engaged in a yoke 117 of U-shape and held by snap pins 118. The yoke 117 is enclosed in an outer and larger yoke 119 and the pin 116 fits into vertically elongated slots 120 in the sides of the yoke 119 so that there can be relative movement between the two yokes, due to the placement of a yieldable pad 121 between these yokes. The yielding nature of the pad 121 at each end portion of the assembly will allow the box beam members 99, the outer yokes 119 and the components carried on the members 99 to move vertically relative to the inner yokes 117. The amount of vertical movement is, however, checked by the depending legs 103 (FIG. 11) so that destructive loading on the bearings 106 and 107 is prevented. Normally there is a slight clearance space 122 between the bottom ends of the legs 103 and the top of the cross channel 94. When the legs 103 bottom or strike out on the cross channel 94 any load beyond that needed to compress the pads 121 will be passed to structure other than the bearings and structure of the crank rod 110. This is a safety feature as will appear presently.

The drive shaft 108 from each end of the assembly extends toward the center of the length of the box beam members 99 where drive motors are suitably connected. In FIG. 10 there are a pair of DC motors 123 of synchronous character so that the shafts 108 can be rotated at the same time and speed. These motors are disposed in the floor pit 91. It is, of course, within this disclosure to employ a single electric or hydraulic motor drive for the shafts 108 so that the box beam members 99 are vertically oscillated in a level attitude.

The box beam members 99 are cross connected (FIG. 10) and 13) by end channels 98 and by intermediate channels 125 to provide a strong support for the vehicle wheel plates 126 which function in the same way as do the plates 23 of FIG. 1. The outer ends of the assembly (FIGS. 10 and 13) are provided with cover plates 127 and the central space between the wheel plates 126 is provided with a cover 128 having reinforcing and stiffeners ribs 129. Each wheel plate 126 has a guide pin means 130 working in socket means 131 carried on the cross member 125 (FIG. 13 is typical). Between the wheel plates and the top of the box beam members 99 are disposed four piezoelectric crystal means 132 (FIG. 11) which are electrically connected as disclosed in FIGS. 3 or 4. These crystals react as before described during the vertical jouncing action of the crank arms 110, and the yielding nature of the pads 121 (FIG. 13) will have no adverse effect on the response of the crystals to the forces exerted thereon.

The respective piezoelectric transducer means 132 for the left and right wheel plates 126 are suitably connected (FIGS. 15 and 16) into circuits associated with the left and right display meters 133 and 134 on the console panel 135. The panel 135 also is provided with a selector switch 136 having an OFF position and two ON positions, one for heavy vehicles and the other for light weight vehicles. There is a start switch 137, and a manual control 138 to vary the jounce frequency by regulating the drive motor means 123.

The electrical circuits for the apparatus of FIG. 10 is seen in FIG. 16 and provides speed control for the drive motor means 123, whether it is electric or hydraulic. The speed control is provided to obtain a linearly increasing speed of rotation of the shafts 108 to the respective eccentric cranks 110 at the opposite end portions of the box beam members 99. When the wheels of the vehicle V of FIG. 8 are placed on the wheel plates 126 and the motor means 123 is energized the vehicle will be vertically oscillated at an increasing speed throughout a test cycle, at the end of which the apparatus will shut itself off. Thus, the start signal from switch 137 is conveyed by line 140 to a ramp generator 141 where a slowly increasing voltage signal is produced and fed to a comparator 142. The comparator compares the ramp signal to the back emf of the motor 123 and produces a signal which is transmitted to the SCR motor control circuits at 143 which, in turn, adjust the speed of the motor 123. It can be seen that the back emf of the motor armature is transmitted by line 144 to the comparator 142, and this produces the effect of having the back emf match exactly the value of the ramp signal voltage from the generator 141. In this same circuit, the manual frequency control R-1 allows the operator to select a desired speed level for the drive motor 123, that is a rather slow build-up to the critical frequency for heavy vehicles, and a rapid critical frequency build-up for light weight vehicles.

During the operation of the apparatus the start signal clears the electronic system of previous readings and conditions a peak hold circuit 145 for the left display meter 133 to receive signals from a buffer amplifier 146 which, in turn, receives the signals developed in the piezoelectric transducers 132 under the left wheel plates 126. Since there are two plates, the circuit of FIG. 16 is typical of a peak hold circuit 145, buffer amplifier 146 for the right wheel plate and group of piezoelectric transducers. Each such circuit is connected to its own display meter, as 133 or 134 and each meter has appropriate ranging and zeroing circuitry 147. The hold circuit 145 in each circuit receives the signals from the transducers 132 through the amplifier 146 and the largest signal level is captured and held in a memory and also displayed at the meters 133 and 134. Each time a test is run with the start switch 137 the circuit 145 is cleared of previous information.

Returning to FIG. 10, it will be remembered that the apparatus is mounted in a floor pit 91 so that the wheel plates 126 and cover plates 127 and 128 are approximately at the level of the shop floor A. The console panel 135 may be located at any convenient place in the shop so that the srea around the pit 91 will be free of cabinets shown in FIG. 2. The open condition of the apparatus allows the passage of vehicles of weight classes much too great for the same. However, the apparatus is protected against damage from over weight vehicles by strike out means such as the before mentioned provision of legs 103 at each end of the box beam members 99. The legs 103 have bottom end clearance spaces 122 over the members 94, and when the weight of a vehicle compresses the pads 121 (FIG. 13) the clearance space 122 is taken up and the legs 103 solidly abut the members 94 so as to take the load off the eccentric cranks 110 and the bearings 106 and 107. The central span of the apparatus is protected against the bending under overloads by the presence of channel-shaped vertical strike out legs 103a (FIG. 10) attached to the underside of the box beam members 99 and having a clearance space 122a at the bottom over support members 104a. Vehicles of weights up to the design limits of the apparatus of FIG. 10 will not cause the legs 103 and 103a to bottom out or strike out. In connection with the protection afforded by 103 and 103a, the drive motor means 123 is controlled on stopping so the eccentric cranks 110 always stop at or very close to bottom dead center so the assembly 90 is normally in its lowered position about level with the shop floor area A.

In either form of the apparatus (FIGS. 2 or 10), the operation produces a vertical jounce effect on the vehicle, either of an increasing frequency or a steady frequency, to subject the suspension system to its critical frequency so the shock absorbers will reach a desired test loading effect. The jounce effect can be selected for the different classifications of vehicles, according to weight or some similar classification factor. Since there are a number of vehicle classes and also a large number of makes of shock absorbers, the operator of the present apparatus will be supplied with shock absorber test specification information which will set out a numerical norm or meter reading value against which vehicle shock absorbers are compared for determining whether a shock absorber is good, marginally effective or bad enough to replace. It is necessary to take into account, when testing a pair of shock absorbers, the side-to-side balance of the work being done by each shock absorber because pairs of shock absorbers do not usually deteriorate at the same rate. It is possible for one shock absorber of a pair to do most of the work of stabilizing a vehicle suspension system, and by appropriate analysis of the left and right meter readings at the console panel 54 or 135 the operator can see which shock absorber of a pair is most effective and which should be replaced. Thus, the present apparatus is effective to analyze shock absorber operation and indicate the effectiveness of each of a pair of shock absorbers, although the apparatus can analyze a single shock absorber in the same manner.

The disclosure in FIG. 10 shows the apparatus substantially flush with the shop floor A and no cabinets at the opposite ends of the assembly 90. When so installed the assembly can be used to jounce one wheel of a vehicle to test the associated shock absorber.

The present apparatus provides a simple and effective means for diagnosing vehicle shock absorbers singly or in pairs where the vehicle wheel is, or wheels are, placed on a load responsive surface and the surface with the vehicle is vertically oscillated through its critical oscillation. The vehicle response to being jounced through its critical frequency will be recorded, without having to attach or connect anything to the vehicle, by the load exerted on the surface supporting the wheel or wheels. The purpose of the jounce is to obtain a reading on the force of the wheel against the supporting surface, and the force so generated is then converted by the display means to produce a reading in a numerical sense. It is, of course, understood that the oscillation of the vehicle is checked by the shock absorber, so that the effect of jouncing the vehicle is to cause the shock absorber to carry out its intended function. The use of transducers makes it easy to measure the pressure or down load on the surface supporting the vehicle wheel which is equivalent of the actual response of the vehicle suspension system to road conditions.

The present apparatus is used in association with a shock absorber specification chart on which are detailed the various makes of shock absorbers, numerical evaluations for new shock absorbers in relation to the weight or class of vehicle with which it is used, and a tolerance allowance or margin of error within which the shock absorbers must fall to be considered safe for further use.

The foregoing description has set forth certain preferred embodiments of apparatus conforming to the improvements which will conform to the objects and advantages above stated.

What is claimed is:

1. Apparatus for testing shock absorbers in place in the wheel suspension systems for vehicles, consisting of a support plate the boundary of which defines an area sufficiently large for at least a first wheel of a vehicle having front and rear wheels, the vehicle being horizontally positioned with a first wheel on said support plate and other wheels spaced there from, a frame carrying said support plate, vehicle wheel load responsive transducer means between said frame and plate, said transducer means being positioned symmetrically around the boundary of said support plate to respond to the load of said first wheel and generate a signal proportional to the first wheel load imposed on said plate at any location of the first wheel on said plate, signal display means connected to said transducer means to display the load imposed on said support plate, and drive means to oscillate said support plate in a vertical direction along a linear path to oscillate said first wheel through its critical frequency and gyrate the vehicle about said other wheels.

2. The apparatus of claim 1 in which said drive means exerts a vertical oscillation of a predetermined amount on said supporting plate, and in which control means connected to said drive means regulates said oscillation to an ever increasing rate through the critical frequency of the suspension system.

3. Apparatus for testing shock absorbers in place in vehicle wheel suspension assemblies to determine whether the shock absorbers are performing within acceptable tolerances, the apparatus comprising, movable wheel support plates the boundaries of which define areas sufficiently large for the first vehicle wheels with the vehicle standing in a generally horizontal position and free to gyrate about second wheels spaced from said support plates, motor means operably connected to said support plates and moving said first vehicle wheels thereon in a generally vertical up and down direction with the vehicle gyrating the said second wheels spaced therefrom, a plurality of load responsive sensor means symmetrically spaced apart under the boundaries of said support plates so as to generate signals proportional to the load exerted by the first vehicle wheels at any places on said support plates, and meter means connected to said sensor means to display the average of said signals in terms of the first vehicle wheel loads imposed on said support plates.

4. The apparatus of claim 3 in which the load responsive sensor means are associated with each of a pair of first vehicle wheels, and said display meter means are individual to the sensor means for each of the first pair of vehicle wheels, whereby the performance of each shock absorber in a first pair of vehicle wheel suspension assemblies is observable at said display meter means.

5. Apparatus for testing shock absorbers for vehicles consisting of a vertically oscillatible member, means to confine the oscillatory movement of said member to a linear path, a vehicle wheel support operably carried on said member for movement relative to said member said support having a boundary defining an area to receive the vehicle wheel, a plurality of load responsive transducer means arranged symmetrically in spaced relation along the boundary of said support and between said support and member to generate a signal that is the result of the load exerted on said support by the vehicle wheel for any location of the vehicle wheel within the defined area on said support, motor means connected to said member to impart said oscillating movement thereto to jounce the vehicle wheel through a predetermined up-and-down stroke, control means connected to said motor means to operate said motor means, and means to display said generated signal.

6. The apparatus set forth in claim 5 wherein said transducer means is engaged by said wheel support means and includes a plurality of piezoelectric elements, said spacing of said elements places them ahead of and behind the vehicle wheel, and said elements are interconnected to generate a signal that is proportional to the load exerted on said wheel support by the vehicle wheel.

7. Apparatus set forth in claim 5 and including means to protect said oscillatible member against being loaded beyond its intended capacity comprising rigid strike out means spaced along said oscillatible member to absorb over loads.

* * * * *

UNITED STATES PATENT OFFICE
CERTIFICATE OF CORRECTION

Patent No. 3,855,841          Dated December 24, 1974

Inventor(s) Lee Hunter

It is certified that error appears in the above-identified patent and that said Letters Patent are hereby corrected as shown below:

Column 10, line 14, after "gyrating" and before "said", delete "the" and substitute therefor -- "about".

Signed and sealed this 18th day of March 1975.

(SEAL)
Attest:

RUTH C. MASON
Attesting Officer

C. MARSHALL DANN
Commissioner of Patents
and Trademarks